(12) United States Patent
Tanaka

(10) Patent No.: US 10,305,108 B2
(45) Date of Patent: May 28, 2019

(54) GRAPHITE-BASED ACTIVE MATERIAL, NEGATIVE ELECTRODE, AND LITHIUM ION SECONDARY BATTERY

(71) Applicant: NEC ENERGY DEVICES, LTD., Sagamihara-shi, Kanagawa (JP)

(72) Inventor: Shin Tanaka, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 306 days.

(21) Appl. No.: 15/300,630

(22) PCT Filed: Mar. 30, 2015

(86) PCT No.: PCT/JP2015/059841
§ 371 (c)(1),
(2) Date: Sep. 29, 2016

(87) PCT Pub. No.: WO2015/152114
PCT Pub. Date: Oct. 8, 2015

(65) Prior Publication Data
US 2017/0110730 A1    Apr. 20, 2017

(30) Foreign Application Priority Data

Mar. 31, 2014 (JP) ................. 2014-073712

(51) Int. Cl.
*H01M 4/00* (2006.01)
*H01M 4/587* (2010.01)
(Continued)

(52) U.S. Cl.
CPC .......... *H01M 4/587* (2013.01); *H01M 4/133* (2013.01); *H01M 4/364* (2013.01); *H01M 4/366* (2013.01);
(Continued)

(58) Field of Classification Search
CPC ...... H01M 4/364; H01M 4/366; H01M 4/133; H01M 10/0525; H01M 2004/027
See application file for complete search history.

(56) References Cited

U.S. PATENT DOCUMENTS

2012/0251888 A1* 10/2012 Yamamoto ............ H01M 4/131
429/231.8

FOREIGN PATENT DOCUMENTS

JP    8-138650 A    5/1996
JP    10-162858 A    6/1998
(Continued)

OTHER PUBLICATIONS

International Search Report for PCT/JP2015/059841 dated Jun. 23, 2015.

*Primary Examiner* — Cynthia H Kelly
*Assistant Examiner* — Monique M Wills
(74) *Attorney, Agent, or Firm* — Sughrue Mion, PLLC

(57) ABSTRACT

A graphite-based active material including: a first composite particle including a first graphite core particle and a first non-graphite-based carbon material covering the surface of the first graphite core particle; and a second composite particle including a second graphite core particle and a second non-graphite-based carbon material covering the surface of the second graphite core particle, wherein the mass fraction of the second non-graphite-based carbon material in the second composite particle, mass fraction B, is 5% by mass or more and more than the mass fraction of the first non-graphite-based carbon material in the first composite particle, mass fraction A, and the proportion of the second composite particle to the total of the first composite particle and the second composite particle is 1% by mass or more.

12 Claims, 1 Drawing Sheet

(51) Int. Cl.
*H01M 10/0525* (2010.01)
*H01M 4/36* (2006.01)
*H01M 4/133* (2010.01)
*H01M 4/02* (2006.01)

(52) U.S. Cl.
CPC .. *H01M 10/0525* (2013.01); *H01M 2004/027* (2013.01)

(56) References Cited

FOREIGN PATENT DOCUMENTS

| | | |
|---|---|---|
| JP | 2001-196095 A | 7/2001 |
| JP | 2005-294011 A | 10/2005 |
| JP | 2007-324067 A | 12/2007 |
| JP | 2009-158496 A | 7/2009 |
| JP | 5270050 B1 | 8/2013 |
| JP | 2014-229517 A | 12/2014 |
| WO | 2010/007898 A1 | 1/2010 |
| WO | 2010/113783 A1 | 10/2010 |
| WO | 2013/084506 A1 | 6/2013 |

\* cited by examiner

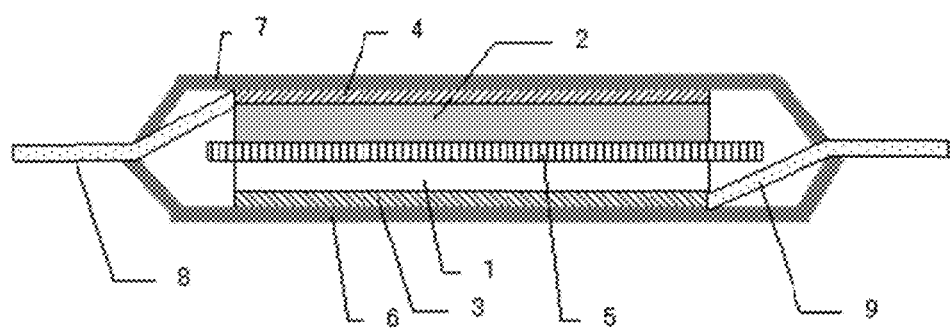

GRAPHITE-BASED ACTIVE MATERIAL, NEGATIVE ELECTRODE, AND LITHIUM ION SECONDARY BATTERY

CROSS REFERENCE TO RELATED APPLICATIONS

This application is a National Stage of International Application No. PCT/JP2015/059841 filed Mar. 30, 2015, claiming priority based on Japanese Patent Application No. 2014-073712 filed Mar. 31, 2014, the contents of all of which are incorporated herein by reference in their entirety.

TECHNICAL FIELD

The present invention relates to a graphite-based active material, a negative electrode, and a lithium ion secondary battery.

BACKGROUND ART

Lithium ion secondary batteries have high energy density and excellent charge/discharge cycle characteristics, and are thus widely used for a power supply for compact mobile devices such as cellular phones and laptop computers. In addition, the recent increasing environmental considerations and growing consciousness of energy saving have been promoting a demand for large batteries having a large capacity and a long life in the fields of electric vehicles, hybrid electric vehicles, power storage, etc.

In general, a lithium ion secondary battery primarily consists of: a negative electrode including a negative electrode active material of a carbon material capable of intercalating and deintercalating a lithium ion; a positive electrode including a positive electrode active material of a lithium composite oxide capable of intercalating and deintercalating a lithium ion; a separator separating the negative electrode and the positive electrode; and a non-aqueous electrolytic solution prepared by dissolving a lithium salt in a non-aqueous solvent.

Amorphous carbon or graphite is used for the carbon material used as the negative electrode active material, and graphite is typically used particularly in an application which requires a high energy density. And thus, development has been conducted for various graphite-based materials.

For example, Patent Literature 1 discloses a composite graphite particle as a negative electrode material for a lithium ion battery, wherein the composite graphite particle includes a core material containing graphite and a carbonaceous layer present on the surface of the core material. Patent Literature 1 also discloses the followings: this carbonaceous layer is obtained by heat-treating the core material which has been attached with an organic compound at a temperature of 500° C. or higher; the content of the carbonaceous layer is 0.05 to 10 parts by mass based on 100 parts by mass of the core material; and the BET specific surface area is 0.2 to 30 $m^2/g$. Patent Literature 1 further discloses that the composite graphite particle has a high acceptability for a lithium ion, and that therefore, a lithium ion battery having good cycle characteristics and output/input characteristics can be obtained by using the composite graphite particle.

Patent Literature 2 disclose use of a negative electrode for a non-aqueous electrolyte secondary battery, wherein the negative electrode includes a graphite particle including a mixture of a covered graphite particle covered with amorphous carbon and a non-covered graphite particle not covered with amorphous carbon. Patent Literature 2 also discloses that the mass fraction of amorphous carbon to 100 parts by mass of the covered graphite particle is 0.1 to 10 parts by mass, and that the specific surface area of the graphite particle mixture of the covered graphite particle and the non-covered graphite particle is 2 to 5 $m^2/g$. Patent Literature 2 further discloses that use of the graphite particle mixture enables inhibition of the precipitation of lithium in charging at a high rate, and enables suppression of cycle degradation through lowering the internal resistance of a negative electrode.

Patent Literature 3 discloses a mixed carbon material including a carbon material A and a carbon material B, wherein the carbon material A and the carbon material B each include a core material including a graphite powder and a surface carbon material (at least one of amorphous carbon and turbostratic carbon) covering or attaching to a part of the surface. Patent Literature 3 also discloses the followings: the compression density of the carbon material A is 1.80 to 1.90 $g/cm^3$; the compression density of the carbon material B is 1.45 to 1.65 $g/cm^3$; the compression density of the mixed carbon material is 1.75 to 1.84 $g/cm^3$; the average particle diameter of the carbon material B is 7 μm or larger and 14 μm or smaller and smaller than the average particle diameter of the carbon material A; the specific surface area of the carbon material A is 4 $m^2/g$ or smaller; and the specific surface area of the carbon material B is 6 $m^2/g$ or smaller. Patent Literature 3 further discloses that a lithium ion secondary battery with the mixed carbon material can achieve high charge acceptability in combination with a high capacity due to high negative electrode density, and in addition has less irreversible capacity.

From another viewpoint, Patent Literature 4 discloses the followings: when a negative electrode is pressed to increase the packing density in order to enhance the capacity of the negative electrode, a portion near the surface of the negative electrode is excessively compressed, and the size of a void present near the surface becomes smaller than that in the interior portion to interrupt the permeation of a non-aqueous electrolytic solution into the negative electrode, which causes shortage of the amount of the electrolytic solution retained in the negative electrode to thereby lead to the degradation of the charge/discharge cycle characteristics of a secondary battery. To solve the problems, a negative electrode is fabricated in Patent Literature 4 by using a method including a step of forming an active material-containing layer having a density of 1.0 to 1.3 $g/cm^3$ by coating a current collector with a coating material containing a fibrous carbonaceous material and a graphite material followed by drying, and a step of pressing the active material-containing layer to increase the density thereof to 1.3 to 1.6 $g/cm^3$. Patent Literature 4 discloses that fabrication of a negative electrode in this manner enables homogenization of the sizes of voids in the active material-containing layer of the negative electrode, and that thus the charge/discharge cycle life of a secondary battery can be enhanced.

Patent Literature 5 discloses a carbonaceous electrode plate for a non-aqueous electrolytic solution secondary battery, wherein the carbonaceous electrode plate includes a sheet-shaped carbonaceous molded product having a density distribution or a porosity distribution in the thickness direction of the sheet and the interior portion of the carbonaceous electrode plate has a higher density or a lower porosity than the outer surface portion. Patent Literature 5 also discloses the followings: the outer surface portion functions as a negative electrode and simultaneously works to allow an electrolytic solution to permeate into the interior portion of the electrode; the interior layer serves to dope/dedope more lithium and simultaneously functions as a current collector having a high electroconductivity; and thus the carbonaceous electrode plate is an excellent negative electrode.

CITATION LIST

Patent Literature

Patent Literature 1: JP5270050B
Patent Literature 2: JP2005-294011A
Patent Literature 3: WO2010/113783
Patent Literature 4: JP2001-196095A
Patent Literature 5: JP8-138650A

SUMMARY OF INVENTION

Technical Problem

In fabricating a negative electrode with a graphite-based active material, pressing of a negative electrode to increase the packing density in order to enhance the capacity causes excessive compression of a portion near the surface of the negative electrode, and the size of a void present near the surface becomes smaller than that in the interior portion to generate a heterogeneous density distribution in the thickness direction of the electrode. As a result, the size of a void present near a current collector in the interior portion of the electrode becomes larger and the packing density is lowered. Generally, an electrode having a higher density allows a secondary battery to have better cycle characteristics, and therefore, the lowered packing density of the electrode as mentioned above causes a difficulty in enhancing the cycle characteristics, which is problematic. Further, it becomes difficult for an electrolytic solution to permeate in the negative electrode due to the small size of a void and the high packing density near the surface of the electrode, and as a result shortage of the amount of an electrolytic solution retained in the negative electrode may be caused to degrade the cycle characteristics of a secondary battery. Furthermore, a residual stress after pressing may cause thickening of the electrode (spring back) to result in the reduction of the capacity of the negative electrode.

An object of the present invention is to provide a graphite-based active material suitable for a lithium ion secondary battery and a negative electrode using the same which can solve at least the problem relating to cycle characteristics among the above problems, and a lithium ion secondary battery having improved cycle characteristics.

Solution to Problem

According to one aspect of the present invention, there is provided a graphite-based active material including: a first composite particle including a first graphite core particle and a first non-graphite-based carbon material covering the surface of the first graphite core particle; and a second composite particle including a second graphite core particle and a second non-graphite-based carbon material covering the surface of the second graphite core particle,
wherein the mass fraction of the second non-graphite-based carbon material in the second composite particle, mass fraction B (amount of covering B), is 5% by mass or more and more than the mass fraction of the first non-graphite-based carbon material in the first composite particle, mass fraction A (amount of covering A), and
the proportion of the second composite particle to the total of the first composite particle and the second composite particle is 1% by mass or more.

According to another aspect of the present invention, there is provided a negative electrode for a lithium ion secondary battery including the above graphite-based active material.

According to another aspect of the present invention, there is provided a lithium ion secondary battery including: a positive electrode capable of intercalating and deintercalating a lithium ion; the negative electrode; and a non-aqueous electrolytic solution.

Advantageous Effects of Invention

According to an exemplary embodiment can be provided a graphite-based active material suitable for a lithium ion secondary battery having excellent cycle characteristics and a negative electrode using the same, and a lithium ion secondary battery having improved cycle characteristics.

BRIEF DESCRIPTION OF DRAWING

FIG. 1 is a cross-sectional view for describing an example of a lithium ion secondary battery according to an exemplary embodiment.

DESCRIPTION OF EMBODIMENT

Hereinafter, an exemplary embodiment will be described.

A graphite-based active material according to an exemplary embodiment includes: a first composite particle including a first graphite core particle and a first non-graphite-based carbon material covering the surface of the first graphite core particle; and a second composite particle including a second graphite core particle and a second non-graphite-based carbon material covering the surface of the second graphite core particle. Here, covering means that a non-graphite-based carbon material covers at least a part of the surface of a graphite core particle, including both the case that a non-graphite-based carbon material covers a part of the surface of a graphite core particle, and the case that a non-graphite-based carbon material covers the entire surface of a graphite core particle. Preferably, 70% or more of the surface of the graphite core particle is covered, more preferably, 80% or more of the surface of the graphite core particle is covered, and even more preferably 90% or more of the surface of the graphite core particle is covered.

In the graphite-based active material according to an exemplary embodiment, the mass fraction of the second non-graphite-based carbon material in the second composite particle (amount of covering B) is more than the mass fraction of the first non-graphite-based carbon material in the first composite particle (amount of covering A). Since the amount of covering B is more than the amount of covering A in the active material, the second composite particle is harder than the first composite particle. Use of the active material according to an exemplary embodiment, in which the hard second composite particle is mixed with the first composite particle, for formation of a negative electrode allows a lithium ion secondary battery with the negative electrode to have enhanced cycle characteristics.

When an electrode is fabricated with a particle having a low hardness, a portion near the surface of the electrode is excessively compressed to deform a particle present near the surface in pressing, and as a result the size of a void present near the surface tends to become smaller than that in the interior portion to thereby increase the density. On the other hand, a pressing pressure tends to be insufficiently transmitted near the current collector in the interior portion, which tends to increase the size of a void to decrease the density. Generally, an electrode having a higher density allows a secondary battery to have better cycle characteristics, and therefore, a secondary battery with an electrode having a portion with low packing density as described above has room for improvement in cycle characteristics. The active material according to an exemplary embodiment allows a pressing pressure to be transmitted homogeneously in the thickness direction of an electrode and thus enables formation of an electrode having a homogeneous density distribution because the first composite particle, which has a relatively low hardness, is mixed with the second composite particle, which has a relatively high hardness, and as a result, a secondary battery having excellent cycle characteristics can be obtained.

Further, a particle present near the surface of an electrode can be prevented from being excessively deformed in pressing, and thus a void having a moderate size is formed near the surface of the electrode. Therefore, the permeability of a non-aqueous electrolytic solution is improved to increase the amount of an electrolytic solution retained, leading to contribution to enhancement of cycle characteristics. In addition, a pressing pressure can be homogeneously transmitted in an electrode, which suppresses thickening of the electrode (spring back) due to a residual stress after pressing, and as a result the reduction of the capacity of the electrode can also be suppressed.

Now, the graphite-based active material according to an exemplary embodiment, the negative electrode using the same, and the lithium ion secondary battery will be described specifically.

(Core Material: First Graphite Core Particle and Second Graphite Core Particle)

For core materials of the first composite particle and the second composite particle (the first graphite core particle and the second graphite core particle) included in the active material according to an exemplary embodiment, common natural graphite or artificial graphite may be used. Graphite materials may be used which have an interlayer spacing of the (002) plane, $d_{002}$, measured by a X-ray diffraction method preferably in the range of 0.3354 to 0.340 nm, more preferably in the range of 0.3354 to 0.338 nm. Among them, natural graphite ($d_{002}$=0.3354) is preferred from the viewpoint of cost, etc. The materials of the first graphite core particle and the second graphite core particle may be different, or the same.

The shape of the first graphite core particle and the second graphite core particle is not limited, and for example, a spheroidal graphite core particle, a bulk graphite core particle, or a scale-shaped graphite core particle may be used, and spheroidal graphite can be suitably used. The shapes of the first graphite core particle and the second graphite core particle may be different, or the same.

The average particle diameter of each of the first core particle and the second core particle may be appropriately selected in accordance with an average particle diameter desired for the corresponding composite particle of the first composite particle and the second composite particle. From the viewpoint of, for example, charge/discharge efficiency and input/output characteristics, the average particle diameter is preferably in the range of 2 to 40 μm, more preferably in the range of 5 to 30 μm, and particularly preferably in the range of 10 to 20 μm. Here, an average particle diameter refers to a particle diameter at an integrated value up to 50% in a particle size distribution (volume-based) (median diameter: $D_{50}$) obtained by using a laser diffraction/scattering method. The particle size distribution $D_{50}/D_5$ of the first core particle and the second core particle to be used may be in the range of 1.2 to 5, for example, and the particle size distribution $D_{50}/D_5$ of the first core particle and the second core particle to be used may be in the range of 2 to 4. Here, $D_5$ refers to a particle diameter at an integrated value up to 5% in a particle size distribution (volume-based) obtained by using a laser diffraction/scattering method.

The BET specific surface area (acquired in measurement at 77 K in accordance with a nitrogen adsorption method) of each of the first core particle and the second core particle is, for example, preferably in the range of 0.3 to 10 m²/g, more preferably in the range of 0.5 to 10 m²/g, and even more preferably in the range of 0.5 to 7 m²/g from the viewpoint of charge/discharge efficiency and input/output characteristics.

(Covering Material: First Non-Graphite-Based Carbon Material and Second Non-Graphite-Based Carbon Material)

Covering the surface of the above-described core material (graphite core particle) with a non-graphite-based carbon material allows a composite particle to be obtained to have a higher hardness according to the amount of covering. In addition, the side reaction between the active material and the electrolytic solution can be inhibited to enhance the charge/discharge efficiency and increase the reaction capacity.

A non-graphite-based carbon material is a carbon material which does not have the three-dimensional crystalline regularity of graphite, and examples thereof include turbostratic carbon materials and amorphous carbon materials, and further include glassy carbon materials and carbon materials with a small degree of crystallization due to a low heat treatment temperature. Among these non-graphite-based carbon materials, amorphous carbon materials having a relatively high hardness are preferred. The first non-graphite-based carbon material and the second non-graphite-based carbon material may be different, or the same.

The method for covering the core material with the non-graphite-based carbon material may be a conventional method. Examples thereof include a method including attaching an organic substance onto the surface of a core material and heat-treating the resultant; and a film-forming method such as a chemical vapor deposition method (CVD method), sputtering method (e.g., ion beam sputtering method), a vacuum deposition method, a plasma method, and an ion plating method.

In the method including attaching an organic substance onto the surface of a core material and heat-treating the resultant, examples of the method for attaching an organic substance onto the surface of the core material include a method including dry-blending an organic substance and the core material, and a method including mixing a solution of an organic substance and the core material and then removing the solvent. Examples of the organic substance which can be used include pitches such as petroleum pitch and coal pitch; and resins such as a phenol resin, a polyvinyl alcohol resin, a furan resin, a polystyrene resin, a polyimide resin, an epoxy resin, cellulose, and sucrose. Carbonization through heat treatment may be performed in a non-oxidizing atmosphere such as an argon gas atmosphere and a nitrogen gas atmosphere at a temperature condition of, for example, 400 to 2000° C., preferably at a temperature condition of 800 to 1200° C., for a heat treatment duration of, for example 0.5 to 12 hours, preferably for a heat treatment duration of 0.5 to 6 hours.

(Amount of Covering A)

The amount of covering A (the mass fraction of the non-graphite-based carbon material in the first composite particle) is preferably 0.1% by mass or more, more preferably 0.2% by mass or more, and even more preferably 0.5% by mass or more. If the amount of covering A is too little, the electrolytic solution tends to decompose at the edge of graphite, which is an active portion, and the generation of a gas or the reduction of cycle life may be caused.

In addition, the amount of covering A is less than the amount of covering B, and preferably less than 5% by mass, more preferably 4% by mass or less, and even more preferably 3% by mass or less. If the amount of covering A is too much, the initial capacity of a battery with the active material may be lowered, or the irreversible capacity in an initial stage of cycles may increase. Also, it may become difficult to increase the compression density of an electrode.

(Amount of Covering B)

The amount of covering B (the mass fraction of the non-graphite-based carbon material in the second composite particle) is more than the amount of covering A, and preferably 5% by mass or more, more preferably 7% by mass or more, even more preferably more than 10% by mass, and particularly preferably 20% by mass or more, and can be set to be 30% by mass or more. If the amount of covering B is too little, a desired effect to improve cycle characteristics may be reduced.

In addition, the amount of covering B is preferably 50% by mass or less, or preferably less than 50% by mass, more preferably 45% by mass or less, and further preferably 40% by mass or less. If the amount of covering B is too much, the initial capacity of a battery with the active material may be lowered, or the irreversible capacity in an initial stage of cycles may increase. Also, it may become difficult to increase the compression density of an electrode.

The amount of covering A and the amount of covering B can be each determined in thermogravimetric analysis. More specifically, by using a thermogravimetric analyzer, each of the first composite particle and the second composite particle is heated to approximately 900° C. at a predetermined temperature elevation rate and the weight change due to combustion caused by the temperature elevation is measured to obtain a weight loss curve (horizontal axis: temperature, vertical axis: weight change), and the amount of covering can be calculated by analyzing the weight loss curve obtained. The weight loss due to the combustion of the covering material (a non-graphite-based carbon material such as amorphous carbon) is present in the lower temperature side, and the weight loss due to the combustion of the core material is present in the higher temperature side. A differential curve (horizontal axis: temperature, vertical axis: weight loss rate (%/K)) is obtained from the weight loss curve, and the amount of covering can be calculated from an integrated value of the peak area in the lower temperature side and an integrated value of the peak area in the higher temperature side.

(Average Particle Diameter and Specific Surface Area of First Composite Particle and Second Composite Particle)

The average particle diameter of the graphite-based active material including the first composite particle and the second composite particle is preferably in the range of 2 to 40 µm and more preferably in the range of 5 to 30 µm from the viewpoint of, for example, charge/discharge efficiency and input/output characteristics. Here, an average particle diameter refers to a particle diameter at an integrated value up to 50% in a particle size distribution (volume-based) (median diameter: $D_{50}$) obtained by using a laser diffraction/scattering method.

In addition, the average particle diameter of the second composite particle is preferably sufficiently large relative to the average particle diameter of the first composite particle, and preferably almost the same as or larger than the average particle diameter of the first composite particle from the viewpoint of enhancement of cycle characteristics. If the average particle diameter of the second composite particle, which has a relatively high hardness, is too small relative to the average particle diameter of the first composite particle, which has a relatively low hardness, the function to transmit a pressing pressure in fabrication of an electrode tends to be exerted insufficiently, which may reduce the effect to enhance cycle characteristics. From these viewpoints, the average particle diameter of the first composite particle is preferably in the range of 2 to 38 µm and more preferably in the range of 5 to 28 µm. The average particle diameter of the second composite particle is preferably in the range of 5 to 40 µm and more preferably in the range of 8 to 30 µm.

The BET specific surface area (acquired in measurement at 77 K in accordance with a nitrogen adsorption method) of a negative electrode active material including the first composite particle and the second composite particle is preferably in the range of 0.3 to 10 $m^2/g$, more preferably in the range of 0.5 to 10 $m^2/g$, and even more preferably in the range of 0.5 to 7.0 $m^2/g$ from the viewpoint of charge/discharge efficiency and input/output characteristics.

The BET specific surface area of the first composite particle is preferably in the range of 3.4 $m^2/g$ or larger and 7.0 $m^2/g$ or smaller, and the BET specific surface area of the second composite particle is preferably in the range of 0.9 $m^2/g$ or larger and smaller than 3.4 $m^2/g$. Alternatively, the BET specific surface area of the first composite particle is preferably in the range of 2.0 $m^2/g$ or larger and 7.0 $m^2/g$ or smaller, and the BET specific surface area of the second composite particle is preferably in the range of 0.9 $m^2/g$ or larger and smaller than 2.0 $m^2/g$.

(Linear Pressure)

The first composite particle and the second composite particle preferably satisfy the following conditions.

The linear pressure required for compressing the second composite particle to a compression density of 1.5 $g/cm^3$, linear pressure B, is higher than the linear pressure required for compressing the first composite particle to a compression density of 1.5 $g/cm^3$, linear pressure A.

Further, the linear pressure required for compressing the first composite particle to a compression density of 1.5 $g/cm^3$, linear pressure A, is preferably in the range of 10 kgf/cm (98 N/cm) or higher and lower than 50 kgf/cm (490 N/cm). Furthermore, the linear pressure required for compressing the second composite particle to a compression density of 1.5 $g/cm^3$, linear pressure B, is preferably in the range of 50 kgf/cm (490 N/cm) or higher and 180 kgf/cm (1765 N/cm) or lower. The linear pressure B is more preferably 100 kgf/cm (490 N/cm) or higher, and is more preferably 170 kgf/cm (1667 N/cm) or smaller.

The linear pressure value described above relates to the hardness of the first composite particle and the second composite particle, and a particle having a higher linear pressure value tends to have a higher hardness. Use of the first composite particle and the second composite particle which each exhibit the above linear pressure provides better cycle characteristics.

Here, linear pressure refers to a value obtained by dividing a load applied to the surface of an electrode with a roll press machine by the width of the electrode. The width of an electrode corresponds to the width of the electrode in a roll width direction at a position to set an electrode in pressing (coating width).

The compression density can be derived in the following manner by using an electrode stamped out in a predetermined size after pressing. Here, an electrode refers to one obtained by applying a slurry containing the first composite particle or the second composite particle on a current collector such as a foil and drying the slurry to form an electrode coating layer.

areal density $A$=(weight of electrode–weight of current collector)/area of electrode electrode density $D=A$/(thickness of electrode–thickness of current collector)

The electrode density D after pressing thus obtained corresponds to the compression density.

For example, the "linear pressure required for compressing to a compression density of 1.5 g/cm$^3$" can be determined as follows: an electrode is subjected to roll press at various loads; the compression densities of the electrode after the respective pressings are measured; and the linear pressure is determined from a load at which the compression density reaches "1.5 g/cm$^3$".

(First Composite Particle to Second Composite Particle Mixing Ratio)

The proportion of the second composite particle to the total of the first composite particle and the second composite particle is preferably 1% by mass or more, more preferably 3% by mass or more, and even more preferably 5% by mass or more. If the proportion of the second composite particle is too small, the effect to improve cycle characteristics may be reduced.

Further, the proportion of the second composite particle to the total of the first composite particle and the second composite particle is preferably 30% by mass or less, more preferably 25% by mass or less, and even more preferably 20% by mass or less. It can be set to be, for example, less than 10% by mass, and can be set to be 8% by mass or less. If the proportion of the second composite particle is too large (in other words, the proportion of the first composite particle is too small), the initial capacity of a battery with the active material may be lowered, or the irreversible capacity in an initial stage of cycles may increase. Also, it may become difficult to increase the compression density of an electrode.

(Method for Manufacturing Graphite-Based Active Material)

A graphite-based active material according to an exemplary embodiment can be manufactured by mixing together the first composite particle and the second composite particle described above with use of a known mixing method. An additional active material may be mixed with the graphite-based active material, as necessary, within a range which does not impair a desired effect. The content of the first composite particle and the second composite particle based on the whole of the graphite-based active material is preferably 90% by mass or more and more preferably 95% by mass or more. The graphite-based active material according to an exemplary embodiment may be composed only of the first composite particle and the second composite particle.

(Negative Electrode for Lithium Ion Secondary Battery)

A negative electrode for a lithium ion secondary battery according to an exemplary embodiment can be obtained, for example, by forming a negative electrode active material layer containing the above graphite-based active material and a binder on a negative electrode current collector.

The negative electrode active material layer may be formed by using a common slurry application method. Specifically, a slurry containing a negative electrode active material, a binder, and a solvent is prepared, and the slurry is applied on a negative electrode current collector, dried, and pressurized, as necessary, to obtain a negative electrode. Examples of the method for applying a negative electrode slurry include a doctor blade method, die coater method, and a dip coating method. Alternatively, a negative electrode can be obtained by forming a thin film of aluminum, nickel, or an alloy of them as a current collector on a negative electrode active material layer which has been formed in advance, in accordance with a vapor deposition method, a sputtering method, or the like.

The binder for a negative electrode is not limited, and examples thereof include polyvinylidene fluoride (PVdF), vinylidene fluoride-hex afluoropropylene copolymers, vinylidene fluoride-tetrafluoroethylene copolymers, styrene-butadiene copolymer rubbers, polytetrafluoroethylene, polypropylene, polyethylene, polyimide, polyamideimide, methyl (meth)acrylate, ethyl (meth)acrylate, butyl (meth) acrylate, (meth)acrylonitrile, isoprene rubbers, butadiene rubbers, and fluororubbers. For the slurry solvent, N-methyl-2-pyrrolidone (NMP) or water may be used. In the case that water is used for the solvent, a thickener may be further used, such as carboxymethylcellulose, methylcellulose, hydroxymethylcellulose, ethylcellulose, and polyvinyl alcohol.

The content of the binder for a negative electrode is preferably in the range of 0.1 to 30 parts by mass, more preferably 0.5 to 25 parts by mass, and more preferably in the range of 1 to 20 parts by mass based on 100 parts by mass of the negative electrode active material from the viewpoint of binding strength and energy density, which are in a trade-off relation.

The negative electrode current collector is not limited, but preferably copper, nickel, stainless steel, molybdenum, tungsten, tantalum, or an alloy containing two or more of them from the viewpoint of electrochemical stability. Examples of the shape include a foil, a plate, and a mesh.

(Lithium Ion Secondary Battery)

The lithium ion secondary battery according to an exemplary embodiment includes the above negative electrode and positive electrode, and an electrolyte.

For fabrication of the positive electrode, for example, a slurry containing a positive electrode active material, a binder, and a solvent (and a conductive aid, as necessary) is prepared, and the slurry is applied on a positive electrode current collector, dried, and pressurized, as necessary, to form a positive electrode active material layer on the positive electrode current collector.

The positive electrode active material is not limited, and a lithium composite oxide or lithium iron phosphate may be used, for example. Examples of the lithium composite oxide include lithium manganate (LiMn$_2$O$_4$); lithium cobaltate (LiCoO$_2$); lithium nickelate (LiNiO$_2$); compounds obtained by substituting at least a part of the manganese, cobalt, and nickel in these lithium compounds with another metal element such as aluminum, magnesium, titanium, and zinc; nickel-substituted lithium manganates obtained by substituting a part of the manganese in lithium manganate with at least nickel; cobalt-substituted lithium nickelates obtained by substituting a part of the nickel in lithium nickelate with at least cobalt; compounds obtained by substituting a part of the manganese in a nickel-substituted lithium manganate with another metal (e.g., at least one of aluminum, magnesium, titanium, and zinc); and compounds obtained by substituting a part of the nickel in a cobalt-substituted lithium nickelate with another metal element (e.g., at least one of aluminum, magnesium, titanium, zinc, and manganese). One of these lithium composite oxides may be used singly, or two or more thereof may be used in a mixture. The average particle diameter of the positive electrode active material which can be used is preferably 0.1 to 50 µm, more preferably 1 to 30 µm, and even more preferably 5 to 25 µm from the viewpoint of, for example, the reactivity to the electrolytic solution and rate characteristics. Here, an average particle diameter refers to a particle diameter at an integrated value up to 50% in a particle size distribution (volume-based) (median diameter: $D_{50}$) obtained by using a laser diffraction/scattering method.

The binder for a positive electrode is not limited, and the binders for a negative electrode can be used. Among them, polyvinylidene fluoride is preferred from the viewpoint of versatility and low cost. The content of the binder for a positive electrode is preferably in the range of 1 to 25 parts by mass, more preferably 2 to 20 parts by mass, and even more preferably 2 to 10 parts by mass based on 100 parts by mass of the positive electrode active material from the viewpoint of binding strength and energy density, which are in a trade-off relation. Further, examples of a binder other than polyvinylidene fluoride (PVdF) include vinylidene fluoride-hexafluoropropylene copolymers, vinylidene fluoride-tetrafluoroethylene copolymers, styrene-butadiene copolymer rubbers, polytetrafluoroethylene, polypropylene, polyethylene, polyimide, and polyamideimide. For the slurry solvent, N-methyl-2-pyrrolidone (NMP) may be used.

The positive electrode current collector is not limited, and aluminum, titanium, tantalum, stainless steel (SUS), another valve metal, or an alloy of them may be used from the viewpoint of electrochemical stability. Examples of the shape include a foil, a plate, and a mesh. In particular, an aluminum foil can be suitably used.

In fabrication of a positive electrode, a conductive aid may be added for the purpose of lowering the impedance. Examples of the conductive aid include carbonaceous fine particles such as graphite, carbon black, and acetylene black.

For the electrolyte, a non-aqueous electrolytic solution in which a lithium salt is dissolved in one or two or more non-aqueous solvents may be used. The non-aqueous solvent is not limited, and example thereof include cyclic carbonates such as ethylene carbonate (EC), propylene carbonate (PC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylates such as methyl formate, methyl acetate, and ethyl propionate; γ-lactones such as γ-butyrolactone; chain ethers such as 1,2-ethoxyethane (DEE) and ethoxymethoxyethane (EME); and cyclic ethers such as tetrahydrofuran and 2-methyltetrahydrofuran. Examples of other non-aqueous solvents which can be used include aprotic organic solvents such as dimethyl sulfoxide, 1,3-dioxolane, dioxolane derivatives, formamide, acetamide, dimethylformamide, acetonitrile, propionitrile, nitromethane, ethylmonoglyme, phosphate triesters, trimethoxymethane, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, and N-methylpyrrolidone.

The lithium salt to be dissolved in the non-aqueous solvent is not limited, and examples thereof include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, and lithium bis (oxalate)borate. One of these lithium salts may be used singly, or two or more thereof may be used in combination. Further, a polymer component may be contained as the non-aqueous electrolyte.

A separator may be provided between the positive electrode and the negative electrode. For the separator, a porous film made of a polyolefin such as polypropylene and polyethylene, a fluororesin such as polyvinylidene fluoride, or polyimide, woven fabric, nonwoven fabric, or the like may be used.

Examples of the shape of a battery include a cylinder, a rectangle, a coin type, a button type, and a laminate type. In the case of a laminate type, it is preferred to use a laminate film for an outer package to contain the positive electrode, the separator, the negative electrode, and the electrolyte. This laminate film includes a resin base material, a metal foil layer, and a heat-seal layer (sealant). Examples of the resin base material include polyester and nylon, and examples of the metal foil layer include an aluminum foil, an aluminum alloy foil, and a titanium foil. Examples of the material for the hot-seal layer include thermoplastic polymer materials such as polyethylene, polypropylene, and polyethylene terephthalate. Each of the resin base material layer and the metal foil layer is not limited to a single layer configuration, and may be in two or more layers. From the viewpoint of versatility and cost, an aluminum laminate film is preferred.

The positive electrode, the negative electrode, and the separator disposed therebetween are contained in an outer package container made of a laminate film, etc., and the electrolytic solution is injected therein, followed by sealing the outer package container. A structure in which an electrode group having a plurality of electrode pairs laminated is contained may be employed.

FIG. 1 illustrates a cross-sectional view of an example of the lithium ion secondary battery according to an exemplary embodiment (laminate type). As illustrated in FIG. 1, the lithium ion secondary battery according to an exemplary embodiment includes: a positive electrode including a positive electrode current collector 3 made of a metal such as an aluminum foil and a positive electrode active material layer 1 provided thereon and containing a positive electrode active material; and a negative electrode including a negative electrode current collector 4 made of a metal such as a copper foil and a negative electrode active material layer 2 provided thereon and containing a negative electrode active material. The positive electrode and the negative electrode are laminated with a separator 5 made of a nonwoven fabric or a polypropylene microporous membrane interposed therebetween so that the positive electrode active material layer 1 and the negative electrode active material layer 2 are positioned on opposite surfaces of the separator 5. This electrode pair is contained in a container formed of outer packages 6, 7 made of an aluminum laminate film or the like. The positive electrode current collector 3 is connected to a positive electrode tab 9 and the negative electrode current collector 4 is connected to a negative electrode tab 8, and these tabs are extracted through the container to the outside. An electrolytic solution is injected into the container, and the container is sealed. Alternatively, a structure in which an electrode group having a plurality of electrode pairs laminated is contained in a container may be used.

EXAMPLES

Example 1

Natural graphite and an organic substance were mixed together at a predetermined mass ratio, and calcined by using a conventional method to prepare a composite graphite particle A and a composite graphite particle B in each of which a graphite particle was covered with amorphous carbon.

The amount of amorphous carbon in the composite graphite particle A obtained was 3% by mass, and the amount of amorphous carbon in the composite graphite particle B obtained was 40% by mass. $D_5$, $D_{50}$, and the specific surface area of the composite graphite particle A were 13.3 µm, 18.4 µm, and 2.5 m$^2$/g, respectively. $D_5$, $D_{50}$, and the specific surface area of the composite graphite particle B were 9.4 µm, 12.4 µm, and 1.0 m$^2$/g, respectively.

The composite graphite particle A in an amount of 95 parts by mass and the composite graphite particle B in an amount of 5 parts by mass were mixed together, and the mixture (negative electrode active material) was mixed with a 1.0 wt % aqueous solution of carboxymethylcellulose to prepare a slurry. A styrene-butadiene copolymer as a binder was mixed therein.

This slurry was applied on one surface of a copper foil having a thickness of 10 µm, and the coating film was dried. Thereafter, the coating film (negative electrode coating film) was roll-pressed so that the density reached 1.4 g/cm$^3$ to obtain a negative electrode sheet having a size of 33×45 mm. A composite oxide (positive electrode active material) in which Li(Li$_{0.1}$Mn$_{1.9}$)O$_4$ and LiNi$_{0.85}$Co$_{0.15}$O$_2$ were mixed together at a mass ratio of 75:25 and polyvinylidene fluoride were dispersed in N-methyl-2-pyrrolidone to prepare a slurry. This slurry was applied on both surfaces of an aluminum foil, and the coating film was dried. Thereafter, the coating film (positive electrode coating film) was roll-pressed so that the density reached 3.0 g/cm$^3$ to obtain a positive electrode sheet having a size of 30×40 mm.

The negative electrode sheet was stacked on each surface of the positive electrode sheet with a separator made of a microporous polyethylene film having a thickness of 25 µm interposed therebetween so that the positive electrode coating film and the negative electrode coating film were positioned on opposite surfaces of the separator. An extraction electrode for a positive electrode and an extraction electrode for a negative electrode were provided, and then the laminate was covered with a laminate film, into which an electrolytic solution was injected, and the resultant was sealed.

The electrolytic solution used was a solution obtained by dissolving a lithium salt (LiPF$_6$) in a mixture of ethylene carbonate and diethyl carbonate at a volume ratio of 3:7 so that the concentration of the lithium salt reached 1.0 mol/L.

The lithium ion secondary battery fabricated as described above was subjected to a charge/discharge cycle test (Cycle-Rate: 1 C, temperature: 45° C. upper limit voltage: 4.2 V, lower limit voltage: 2.5 V), and the capacity retention rate after 400 cycles was determined to be 64%.

A negative electrode sheet was fabricated in the same manner as in the above except that the composite graphite particle A in a single configuration was used, and the linear pressure A (linear pressure required for compressing to a compression density of 1.5 g/cm$^3$) was measured to be 30 kgf/cm$^2$ (294 N/cm).

A negative electrode sheet was fabricated in the same manner as in the above except that the composite graphite particle B in a single configuration was used, and the linear pressure B (linear pressure required for compressing to a compression density of 1.5 g/cm$^3$) was measured to be 170 kgf/cm$^2$ (1667 N/cm).

Comparative Example 1

A lithium ion secondary battery was fabricated in the same manner as in Example 1 except that only the composite graphite particle A was used as a negative electrode active material.

A charge/discharge cycle test was carried out by using the same conditions as in Example 1, and the capacity retention rate after 400 cycles was determined to be 60%.

As described above, mixing the composite graphite particle B having a large amount of covering of amorphous carbon with the composite graphite particle A having a small amount of covering of amorphous carbon (Example 1) enhanced the capacity retention rate after 400 cycles compared to the case that the composite graphite particle B was not mixed (Comparative Example 1).

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

The present application claims the right of priority based on Japanese Patent Application No. 2014-73712 filed on Mar. 31, 2014, the entire disclosure of which is incorporated herein by reference.

REFERENCE SIGNS LIST

1 positive electrode active material layer
2 negative electrode active material layer
3 positive electrode current collector
4 negative electrode current collector
5 separator
6 laminate outer package
7 laminate outer package
8 negative electrode tab
9 positive electrode tab

The invention claimed is:

1. A graphite-based active material comprising:
a first composite particle comprising a first graphite core particle and a first non-graphite-based carbon material covering a surface of the first graphite core particle; and
a second composite particle comprising a second graphite core particle and a second non-graphite-based carbon material covering a surface of the second graphite core particle,
wherein a mass fraction of the second non-graphite-based carbon material in the second composite particle, mass fraction B, is 5% by mass or more and more than a mass fraction of the first non-graphite-based carbon material in the first composite particle, mass fraction A,
the proportion of the second composite particle to a total of the first composite particle and the second composite particle is 1% by mass or more, and
a linear pressure required for compressing the second composite particle to a compression density of 1.5 g/cm$^3$, linear pressure B, is higher than a linear pressure required for compressing the first composite particle to a compression density of 1.5 g/cm$^3$, linear pressure A.

2. The graphite-based active material according to claim 1, wherein the proportion of the second composite particle to the total of the first composite particle and the second composite particle is 3% by mass or more.

3. The graphite-based active material according to claim 1, wherein the proportion of the second composite particle to the total of the first composite particle and the second composite particle is 30% by mass or less.

4. The graphite-based active material according to claim 1, wherein the mass fraction of the second non-graphite-based carbon material in the second composite particle, mass fraction B, is more than 10% by mass.

5. The graphite-based active material according to claim 1, wherein the mass fraction of the second non-graphite-based carbon material in the second composite particle, mass fraction B, is less than 50% by mass.

6. The graphite-based active material according to claim 1, wherein the mass fraction of the first non-graphite-based carbon material in the first composite particle, mass fraction A, is in a range of 0.1% by mass or more and less than 5% by mass.

7. The graphite-based active material according to claim 1, wherein the mass fraction of the first non-graphite-based carbon material in the first composite particle, mass fraction A, is in a range of 0.1% by mass or more and 4% by mass or less.

8. The graphite-based active material according to claim 1,
wherein a linear pressure required for compressing the first composite particle to a compression density of 1.5 g/cm$^3$, linear pressure A, is in a range of 10 kgf/cm (98 N/cm) or higher and lower than 50 kgf/cm (490 N/cm), and
a linear pressure required for compressing the second composite particle to a compression density of 1.5 g/cm$^3$, linear pressure B, is in a range of 50 kgf/cm (490 N/cm) or higher and 180 kgf/cm (1765 N/cm) or lower.

9. The graphite-based active material according to claim 1, wherein the first graphite core particle and the second graphite core particle each comprise natural graphite.

10. The graphite-based active material according to claim 1, wherein the first non-graphite-based carbon material and the second non-graphite-based carbon material each comprise amorphous carbon.

11. A negative electrode for a lithium ion secondary battery, comprising the graphite-based active material according to claim 1.

12. A lithium ion secondary battery comprising: a positive electrode capable of intercalating and deintercalating a lithium ion; the negative electrode according to claim 11; and a non-aqueous electrolytic solution.

* * * * *

UNITED STATES PATENT AND TRADEMARK OFFICE
CERTIFICATE OF CORRECTION

PATENT NO. : 10,305,108 B2
APPLICATION NO. : 15/300630
DATED : May 28, 2019
INVENTOR(S) : Shin Tanaka Page 1 of 1

It is certified that error appears in the above-identified patent and that said Letters Patent is hereby corrected as shown below:

In the Specification

Column 10, Line 20, Delete, "fluoride-hex afluoropropylene" and insert
--fluoride-hexafluoropropylene-- therefor Signed and Sealed this
Seventeenth Day of September, 2019

Andrei Iancu
*Director of the United States Patent and Trademark Office*